P. S. Felter,
Permutation Lock.
No. 2,151. Reissued Jan. 23, 1866.
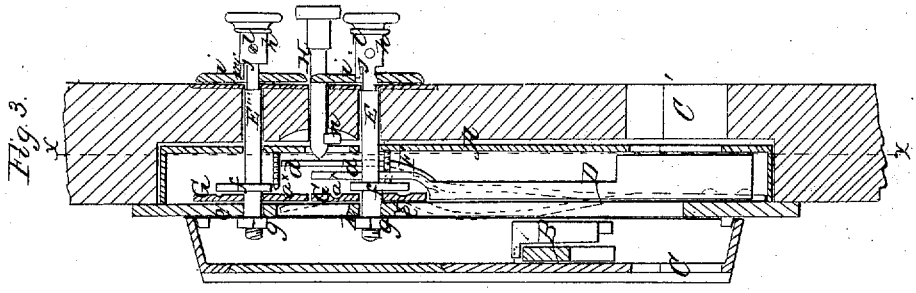
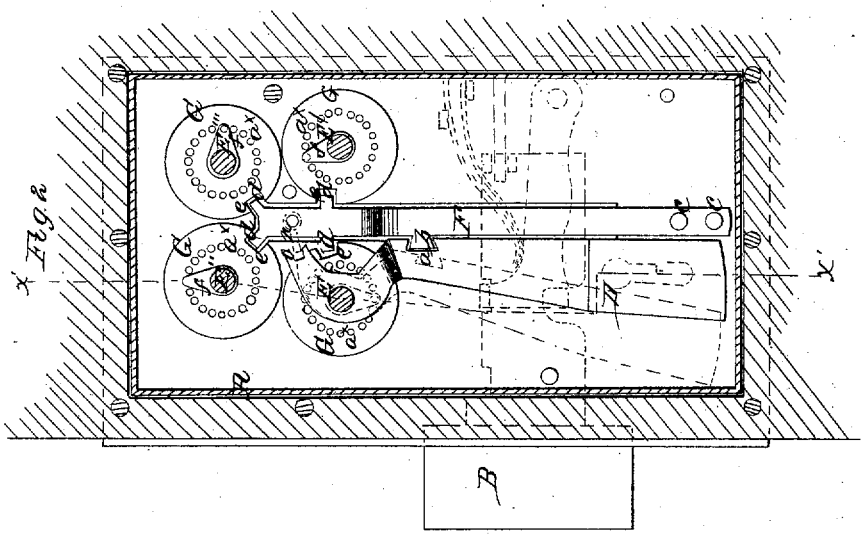
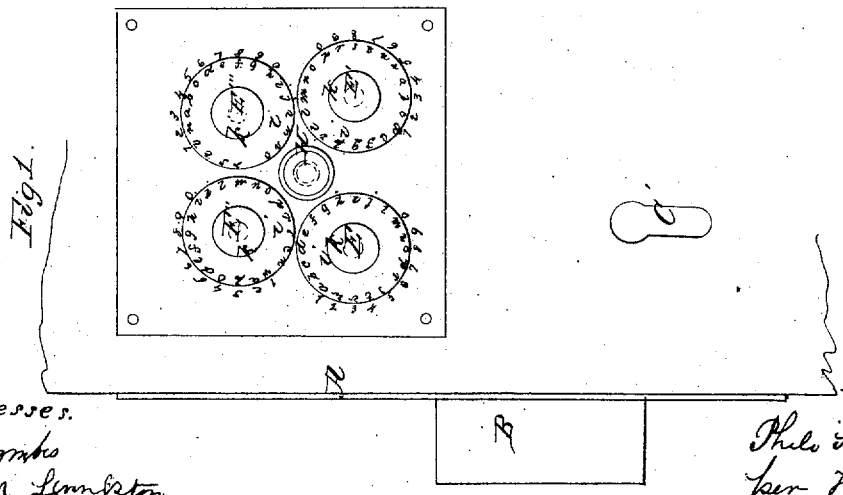
Witnesses.
J. W. Coombs
N. N. Longfellow
Inventor
Phile S. Felter
per Munn & Co
Attorneys
AM. PHOTO-LITHO. CO. N.Y. (OSBORNE'S PROCESS.)

UNITED STATES PATENT OFFICE.

PHILO S. FELTER, OF CINCINNATUS, NEW YORK.

IMPROVEMENT IN LOCKS.

Specification forming part of Letters Patent No. 2,929, dated December 17, 1861; Reissue No. 2,151, dated January 23, 1866.

*To all whom it may concern:*

Be it known that I, PHILO S. FELTER, of Cincinnatus, in the county of Cortland and State of New York, have invented a new and useful Improvement in Locks; and I do hereby declare the following to be a full, clear, and exact description thereof, reference being had to the accompanying drawings, making part of this specification, in which—

Figure 1 is an external front view of a lock with my improvements applied thereto. Fig. 2 is a section of the same taken in the line *x x*, Fig. 3. Fig. 3 is a section of the same taken through the line *x x*, Fig. 2.

Similar letters of reference indicate like parts in all the drawings.

One object of my invention is to obtain a simple and effectual mechanism by which the key-hole may be guarded so as to prevent the admission of a key when the lock is in a locked state, and thereby preclude the possibility of picking the lock or obtaining an impression to fit a key.

Another object of my invention is to combine a mechanism with the key-hole cover of a lock so that it may be locked and unlocked by means of figures, letters, or other symbols.

The first part of my invention consists in the employment or use of a spring in connection with movable circular slotted disks and movable dials, a key, and guard, all arranged substantially as hereinafter described.

The second part of my invention consists in combining with a key-hole cover of a lock (constructed as hereinafter described) a dial or series of dial-plates whereby the lock may be operated by means of figures, letters, or other indicia.

To enable others skilled in the art to make and use my invention, I will describe the same.

A represents the case of a lock.

B is the bolt, which may be operated by a key in the ordinary way.

C C′ are the key-holes of the lock.

D represents a guard, which is formed of a metal bar suspended on a rod or arbor, E, which passes through it near its upper end. The bar or guard D is allowed to swing freely on the rod or arbor E, and the lower end of the guard D, when the latter is in use, passes in line with the key-hole C C′, so as to effectually prevent the insertion of a key through the front key-hole, C′, as seen in Fig. 3. The bar or guard D has a dovetailed recess, *a*, made in it, and in this recess an inversely corresponding projection, *b*, on a spring, F, fits. This spring F is formed of a flat strip of steel secured within the lower part of the case A, as shown at *c*. This spring F, by means of its projection *b*, fitting in the recess *a* of the bar or guard D, holds the latter in line with the key-hole C′, as will be seen by reference to Fig. 2. The upper end of the spring F is provided with four projections, *d*, two at each side, as shown in Fig. 2, and these projections, when the bar or guard D covers the key-hole, are in front of circular disks G, which are each provided with a notch, *e*. The disks G are placed loosely on rods or arbors E E′ E″ E‴, the arbor E being the one on which the bar or guard D is suspended. The disks G are connected to the arbors E E′ E″ E‴ by means of pins *e**, which are at the ends of arms *f* on the arbors. The inner ends of the arbors have screw-threads cut on them, and nuts *g* are placed thereon, said nuts being at the back side of a central plate, *h*, in the lock, through which the arbors pass. The outer ends of the arbors project through the front plate of the locks, and have circular disks or dial-plates *i* placed loosely on them, said dials being on the outer front side of the case A and being secured to the arbors by means of pins *j*, which are at the inner ends of knobs *k*, said knobs being fastened on the arbors by means of screws *l*, and the pins *j* fitting in the notches *m* in the dials *i*, as seen in Fig. 3. The dials *i* are lettered all around near their edges, and the outer case of the lock-plate is numbered, the numbers extending about half-way around the dials *i*, as shown in Fig. 1.

H is an auxiliary key, which passes into the back case, A, at such a point as to bear against the spring F. This key is allowed to slide longitudinally in the lock-case, and it is provided with a bit, *n*, as shown in Fig. 3. The upper end of the bar or guard D is notched as shown at *o*, and is curved toward the key H, as seen in Fig. 2.

Operation: When the lock is in a locked state, the bar or guard D is over the key-hole C′, and is retained in that position by the spring F, as previously referred to. In order, therefore, to release the bar or guard D it is necessary to force back the spring F until its projection *b* is out from the recess *a* in the bar or guard D, and to effect this the disks G must be so turned that their notches *e* will be in line with the projections *d* of the spring F, in order that the projections *d* may pass through the notches *e*, and thus admit of the spring F being forced back. The spring is forced back under the action of the auxiliary key H, and when forced back the key is turned and its bit *n* catches into the notch *o* at the upper end of the bar or guard D, and the lower end of the latter is moved out of line with the key-hole C′, so that the key of the lock may be inserted to act upon the bolt B. The disks G are turned in proper position to bring their notches *e* in a proper relative position with the projections *d* on the spring F by the aid of the letters on the dials *i* and the number on the lock-plate, and changes may be made from time to time by simply shifting the pins *c** of the arms *f*, in different holes *a** in the disks, the nuts *g* being unscrewed to admit of the drawing out of the arbors. (See Fig. 3.) The dials *i* may also be shifted for the same purpose by drawing out the pin *j* from the notches *m* in the dial *i*, as shown in Fig. 3.

I am aware that slides have been arranged within locks to pass over the key-holes of the same in order to prevent the locks being picked, and I therefore do not claim, broadly, such device.

I am also aware that lettered or figured dials have been used in connection with numbers on the outer plate of the lock-case; but I am not aware of any instance in which figured or numbered dials and figured or numbered plates have been used in combination with a common lock whereby a lock is rendered convertible from a combination or burglar-proof lock to a common lock, and vice versa.

What I claim as new, and desire to secure by Letters Patent, is—

1. The bar or guard D, provided with the recess *a*, in connection with the notched disks G, spring F, provided with the projections *b d d*, and the key H, arranged substantially as and for the purpose herein set forth.

2. In combination with the subject-matter of the above, the employment of numbered or lettered dials, by means of which the lock may be used as a burglar-proof or common lock, as desired, substantially as set forth.

PHILO S. FELTER.

Witnesses:
S. W. SMITH,
ISRAEL GEE.